June 13, 1939.  D. B. FLOWER  2,161,782
PIPE HANGER
Filed Oct. 21, 1938
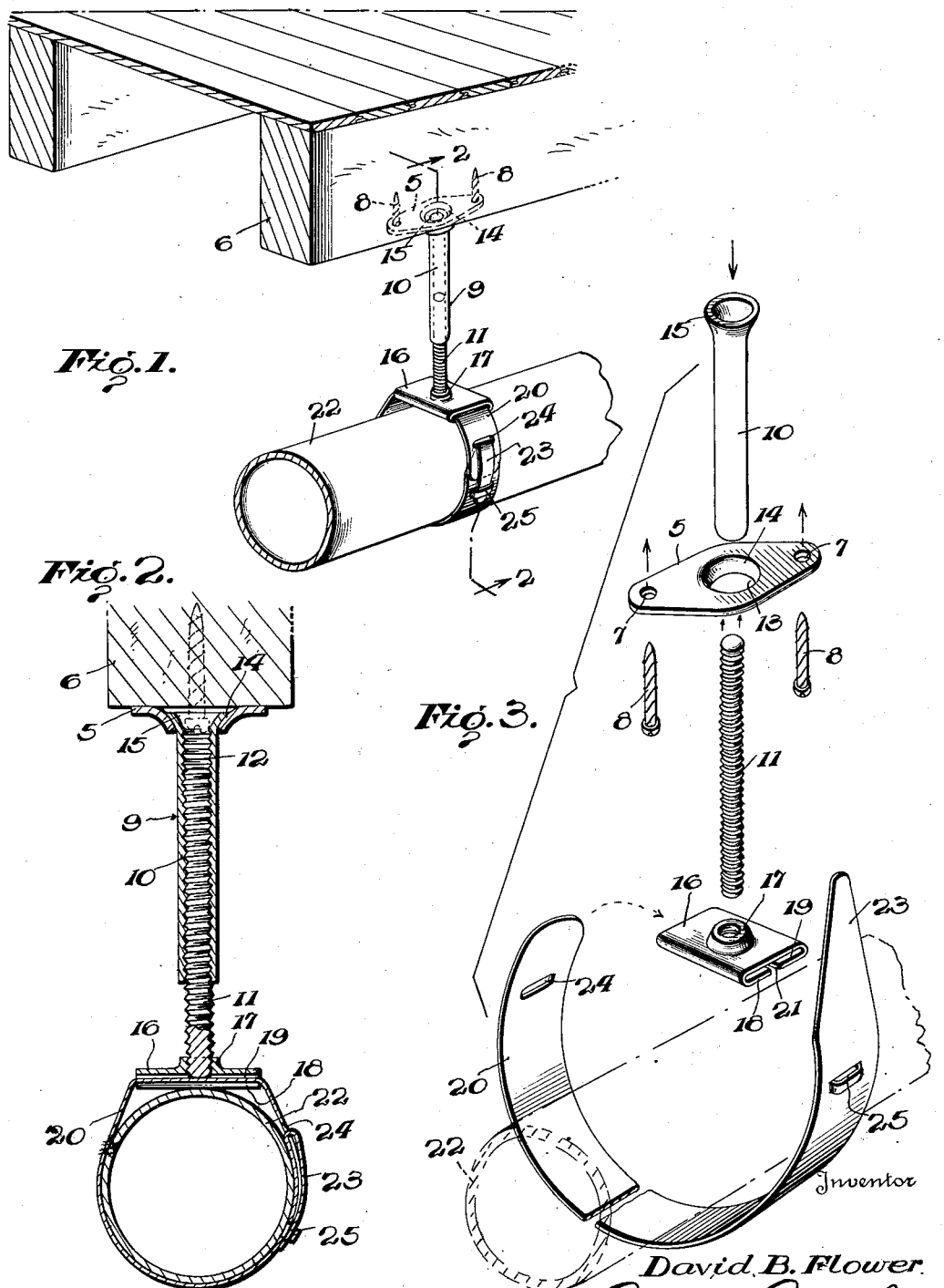
Inventor
David B. Flower
By Ralph Burch
Attorney Patented June 13, 1939

2,161,782

UNITED STATES PATENT OFFICE 2,161,782

PIPE HANGER

David B. Flower, Philadelphia, Pa.

Application October 21, 1938, Serial No. 236,310

4 Claims. (Cl. 248—59)

This invention relates to improvements in pipe hangers for suspending pipe lines from an overhead support.

It is an object of the invention to provide a hanger having the supporting member pivotally suspended from its attaching bracket, whereby the supporting member is freely rotatable and capable of limited swinging movement to allow for expansion and contraction of the pipe line supported thereby and which will greatly facilitate alinement of the pipe line when erecting the same.

A further object of the invention resides in providing a supporting member which is vertically adjustable to permit proper spacing of the pipe line with respect to the overhead support, the member being capable of adjustment without the necessity of detaching the pipe line from the hanger.

A still further object of the invention resides in providing a clamping band for connecting the pipe line to the supporting member, which is readily adjustable to embrace pipes of various diameters and having means whereby the band is held in its adjusted position without danger of accidental displacement.

Another object of the invention resides in providing a device of the above-mentioned character which is simple and durable in construction, reliable and efficient in use, attractive in appearance, and inexpensive to manufacture.

Other objects and advantages of the invention will be apparent during the course of the following description.

In the accompanying drawing forming a part of this specification and in which like numerals are employed to designate like parts throughout the same, Figure 1 is a perspective view of the pipe hanger suspended from a support with the pipe line supported thereby, Figure 2 is a longitudinal section taken on line 2—2 of Figure 1, and Figure 3 is a perspective view of the pipe hanger with the parts in separate relation.

In the drawing, wherein for the purpose of illustration I have shown a preferred embodiment of my invention, the numeral 5 denotes an attaching bracket for securing the hanger to a beam 6 or other supporting structure. The bracket is in the form of an oval-shaped plate with openings 7 in each end to receive screws 8 or other suitable fasteners for fixedly securing the plate to the beam. A supporting member 9 is pivotally suspended from the bracket 5, the member 9 consisting of a tubular section 10 and screw-threaded rod 11 having threaded engagement with the screw-threaded bore 12 of the tubular section to permit adjustment of the length of the supporting member. The bracket 5 is provided with a central opening 13 and the material around the opening is pressed outwardly forming a beveled seat 14 on the inner side of the opening. The free end of the tubular section 10 of the supporting member 9 extends through the opening 13 of the bracket and is flared outwardly, as at 15, for bearing engagement with the beveled seat 14 whereby a swiveled connection is established between the bracket 5 and supporting member 9 permitting rotation and swinging movement of the supporting member. The free end of the screw rod 11 is connected to a head 16 by threadedly engaging in a threaded boss 17 formed in the center of the head. The head 16 is provided at opposite sides with inwardly directed flanges 18 which are spaced from the underside of the head to form a transverse slot 19 adapted to receive a pipe clamping band 20 and the meeting edges of the flanges are slightly spaced apart as at 21. The band 20 is of sufficient length to encircle a pipe 22 and one end of the band is reduced in width to form a tongue 23 adapted to be inserted through a slot 24 formed in the band adjacent its opposite end and after passing through the slot the tongue is reversely bent to overlap the joint between the ends of the band with its free end engaged beneath a keeper 25 formed by striking a metal loop from the band which securely holds the tongue from being accidentally disengaged from the slot 24 under the weight of the pipe. After clamping the band around the pipe the rod 11 is screwed down in the boss 17 to engage and clamp the band in the slot 19 in fixed relation to the head 16.

In use, the swiveled connection between the supporting member 9 and bracket 5 permits the member to revolve freely and swing in all directions which facilitates alinement of the pipe when erecting the same without removal of the hanger. The hanger is extremely efficient in supporting copper piping as it will allow for the greater expansion and contraction of piping constructed of this metal. The adjustable feature of the supporting member 9 is also advantageous as it permits the pipe line to be raised or lowered without detaching the hanger. The keeper 25 provided to receive the tongue 23 of the pipe clamping band 20 affords security against the band's becoming unlatched and releasing the pipe.

It is to be understood that the form of invention herein shown and described is to be taken as a preferred example of the same and that certain changes in the shape, size, and arrangement of the parts may be made without departing from the spirit of the invention or the scope of the subjoined claims.

Having thus described my invention, I claim:

1. A pipe hanger comprising an attaching bracket, a suspended supporting member having swiveled connection at its upper end with said bracket, a head attached to the lower end of said supporting member having a transverse slot therethrough, a flexible clamping band adapted to pass through the slot of said head, a tongue at one end of said band adapted to pass through a slot in the other end thereof to hold the band around a pipe, and a keeper to receive the end of said tongue.

2. A pipe hanger comprising an attaching bracket, a suspended supporting member consisting of a tubular section having swiveled connection with said bracket and a screw rod threadedly engaged in the bore of the tubular section, a head attached to the lower end of said screw rod having a transverse slot therethrough, a flexible clamping band adapted to pass through the slot of said head, a tongue at one end of said band adapted to pass through a slot in the opposite end thereof to secure the band in embracing relation to the pipe, and a keeper formed in said band to receive the free end of said tongue.

3. A pipe hanger comprising an attaching bracket having an apertured socket, a supporting member consisting of a tubular section having one end extending through the apertured socket and flared to form a swiveled connection with the socket and a screw rod having threaded engagement with the bore of the tubular section, a head attached to the lower end of the screw rod having a transverse slot therethrough, a flexible clamping band extending through the slot of said head, a tongue at one end of said band adapted to pass through a slot in the opposite end thereof to secure the band in embracing relation to the pipe, and a keeper formed in said band to receive the free end of said tongue.

4. A pipe hanger comprising an attaching bracket, a suspended supporting member having swiveled connection at its upper end with said bracket and provided with screw threads on its lower end, a head threaded on the lower end of said supporting member having a transverse slot therethrough, and a clamping band adapted to pass through the slot of said head beneath the lower end of the supporting member, said lower end of the supporting member being adapted to engage said band to secure the same in said head.

DAVID B. FLOWER.